US008660951B2

(12) United States Patent  
Calman et al.

(10) Patent No.: US 8,660,951 B2  
(45) Date of Patent: Feb. 25, 2014

(54) PRESENTING OFFERS ON A MOBILE COMMUNICATION DEVICE

(75) Inventors: Matthew A. Calman, Charlotte, NC (US); Erik Stephen Ross, Charlotte, NC (US); Alfred Hamilton, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/342,041

(22) Filed: Jan. 1, 2012

(65) Prior Publication Data

US 2012/0233070 A1  Sep. 13, 2012

Related U.S. Application Data

(60) Provisional application No. 61/450,213, filed on Mar. 8, 2011, provisional application No. 61/478,409, filed on Apr. 22, 2011.

(51) Int. Cl.  
*G06Q 40/00* (2012.01)

(52) U.S. Cl.  
USPC ...... 705/41; 705/14.4; 705/14.49; 705/14.69; 705/14.71; 705/14.72

(58) Field of Classification Search  
USPC ............ 705/14.4, 14.49, 14.69, 14.71, 14.72, 705/41  
See application file for complete search history.

(56) References Cited

U.S. PATENT DOCUMENTS

| 7,016,532 B2 | 3/2006 | Boncyk et al. |
| 7,155,228 B2 | 12/2006 | Rappaport et al. |
| 7,403,652 B2 | 7/2008 | Boncyk et al. |
| 7,412,081 B2 | 8/2008 | Doi |
| 7,424,303 B2 | 9/2008 | Al-Sarawi |
| 7,477,780 B2 | 1/2009 | Boncyk et al. |
| 7,526,280 B2 | 4/2009 | Jung et al. |
| 7,564,469 B2 | 7/2009 | Cohen |
| 7,565,008 B2 | 7/2009 | Boncyk et al. |
| 7,680,324 B2 | 3/2010 | Boncyk et al. |
| 7,775,437 B2 | 8/2010 | Cohen |
| 7,792,738 B2 | 9/2010 | Channell |
| 7,881,529 B2 | 2/2011 | Boncyk et al. |
| 7,899,243 B2 | 3/2011 | Boncyk et al. |
| 7,899,252 B2 | 3/2011 | Boncyk et al. |

(Continued)

OTHER PUBLICATIONS

Welch, M. J. (2010). Addressing the challenges of underspecification in web search. (Order No. 3446833, University of California, Los Angeles). ProQuest Dissertations and Theses, 137. Retrieved from http://search.proquest.com/docview/85810500?accountid=14753. (858101500).*

(Continued)

*Primary Examiner* — Muriel Tinkler

(74) *Attorney, Agent, or Firm* — Michael A. Springs; Moore & Van Allen PLLC; Tracea L. Rice

(57) ABSTRACT

Systems, methods, and computer program products provide for presentation of product offers in conjunction with a live video stream that includes images of the product or images associated with the product. The invention identifies products located proximate to a mobile communication, for example using real-time object recognition techniques, product codes, wireless communication or the like to identify products. Once the products are identified, related offers are determined and offer indicators are presented proximate to the location of the image in the live video stream.

40 Claims, 6 Drawing Sheets

(56) References Cited

U.S. PATENT DOCUMENTS

| | | | |
|---|---|---|---|
| 8,138,930 | B1 | 3/2012 | Heath |
| 2003/0064705 | A1 | 4/2003 | Desiderio |
| 2004/0021584 | A1 | 2/2004 | Hartz, Jr. et al. |
| 2004/0024709 | A1 | 2/2004 | Yu et al. |
| 2006/0100951 | A1 | 5/2006 | Mylet et al. |
| 2007/0140595 | A1 | 6/2007 | Taylor et al. |
| 2008/0040278 | A1 | 2/2008 | DeWitt |
| 2008/0214210 | A1 | 9/2008 | Rasanen et al. |
| 2008/0268876 | A1* | 10/2008 | Gelfand et al. ............... 455/457 |
| 2009/0006191 | A1* | 1/2009 | Arankalle et al. ............. 705/14 |
| 2009/0089131 | A1* | 4/2009 | Moukas et al. .................. 705/8 |
| 2009/0094125 | A1 | 4/2009 | Killian et al. |
| 2009/0102859 | A1 | 4/2009 | Athsani et al. |
| 2009/0140839 | A1 | 6/2009 | Bishop et al. |
| 2009/0144164 | A1 | 6/2009 | Wane et al. |
| 2009/0171850 | A1 | 7/2009 | Yuval |
| 2009/0182748 | A1 | 7/2009 | Walker |
| 2009/0204511 | A1 | 8/2009 | Tsang |
| 2009/0250515 | A1 | 10/2009 | Todd et al. |
| 2010/0130226 | A1 | 5/2010 | Arrasvuori et al. |
| 2010/0185529 | A1 | 7/2010 | Chesnut et al. |
| 2010/0228776 | A1* | 9/2010 | Melkote et al. ............... 707/770 |
| 2010/0250581 | A1 | 9/2010 | Chau |
| 2011/0022540 | A1 | 1/2011 | Stern et al. |
| 2011/0034176 | A1 | 2/2011 | Lord et al. |
| 2011/0077046 | A1* | 3/2011 | Durand et al. ............. 455/550.1 |
| 2011/0106622 | A1* | 5/2011 | Kuhlman et al. .......... 705/14.53 |
| 2011/0119155 | A1 | 5/2011 | Hammad et al. |
| 2011/0202466 | A1 | 8/2011 | Carter |
| 2012/0100915 | A1* | 4/2012 | Margalit et al. ................. 463/31 |

OTHER PUBLICATIONS

K.J. Jeevan, & Padhi, P. (2006). A selective review of research in content personalization. Library Review, 55(9), 556-586. doi:http://dx.doi.org/10.1108/00242530610706761.*

Lissner, P. A. (2007). Chi-thinking: Chiasmus and cognition. (Order No. 3297307, University of Maryland, College Park). ProQuest Dissertations and Theses, , 487. Retrieved from http://search.proquest.com/docview/304851937?accountid=14753. (304851937).*

International Searching Authority, PCT International Search Report and Written Opinion dated Jun. 14, 2012. PCT International Application No. PCT/US12/27892. Name of applicant: Bank of America Corporation. English Language. 19 pages.

International Searching Authority. PCT International Search Report and Written Opinion dated Jun. 8, 2012. PCT International Application No. PCT/US2012/027912. Name of Applicant: Bank of America Corporation. English Language. 12 pages.

International Searching Authority, PCT International Search Report and Written Opinion dated May 28, 2012. PCT International Application No. PCT/US12/28036. Name of Applicant: Bank of America Corporation. English Language. 11 pages.

International Searching Authority. PCT International Search Report and Written Opinion dated May 22, 2012. PCT International Application No. PCT/US12/28008. Name of Applicant: Bank of America Corporation. English Language. 13 pages.

International Searching Authority. PCT International Search Report and Written Opinion dated Sep. 24, 2012. PCT International Application No. PCT/US12/48697. Name of Applicant: Bank of America Corporation. English Language. 14 pages.

International Search Report and Written Opinion issued in PCT/US12/27890, dated Feb. 5, 2013.

* cited by examiner

PRESENTING OFFERS ON A MOBILE COMMUNICATION DEVICE

CROSS-REFERENCE TO RELATED APPLICATIONS

This application claims priority to U.S. Provisional Patent Application Ser. No. 61/450,213, filed Mar. 8, 2011, entitled "Real-Time Video Image Analysis Applications for Commerce Activity," and U.S. Provisional Patent Application Ser. No. 61/478,409, filed Apr. 22, 2011, entitled "Presenting Offers on a Mobile Communication Device," the entirety of each of which is incorporated herein by reference.

FIELD OF THE INVENTION

In general, embodiments herein disclosed relate to commerce and, more specifically presenting product offers, discounts, coupons or the like on a mobile communication device in conjunction with a live video stream.

BACKGROUND

Modern handheld mobile devices, such as smart phones or the like, combine multiple technologies to provide the user with a vast array of capabilities. For example, many smart phones are equipped with significant processing power, sophisticated multi-tasking operating systems, and high-bandwidth Internet connection capabilities. Moreover, such devices often have addition features that are becoming increasing more common and standardized features. Such features include, but are not limited to, location-determining devices, such as Global Positioning System (GPS) devices; sensor devices, such as accelerometers; and high-resolution video cameras.

Therefore, a need exists to further the capabilities of mobile communication devices and, in particular leverage augmented-reality type analysis to provide mobile device user's with greater access to information

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.\

Methods, apparatus systems and computer program products are described herein that provide for presenting product offers in conjunction with a live video stream that includes the product or an object associated with the product. Products may be identified that are proximate to a mobile communication device via object recognition techniques, product codes, wireless communication, location determination or the like. Once products have been identified, related offers are determined and offer indicators are displayed in the live video stream proximate to the display of the product or an object associated with the product. The user can select the offer or offer indicator to receive further information about the offer, download the offer to an electronic wallet, or initiate purchase of the product either online or at the currently located retailer.

A method for providing product offers for display on a mobile communication device defines first embodiments of the invention. The method includes identifying one or more products proximate in location to the mobile communication device and determining one or more offers, each offer associated with one or more of the identified products. The method further includes presenting, within a display of the live video stream on the mobile communication device, one or more offer indicators, each offer indicator associated with a determined offer and presented proximate in location to display of a corresponding product or an object associated with the product.

In specific embodiments of the method, identifying products further includes capturing, by the mobile communication device, images of the one or more products and implementing object recognition processing to identify one or more images that correspond to a product. In other related embodiments, identifying products further includes capturing, by the mobile communication device, an image-based code, such as barcode, Quick response code or the like, located on or proximate to one or more of the products and reading the code to identify the product.

In further specific embodiments of the method, identifying products further includes receiving, at the mobile communication device, wireless communication, such as Radio Frequency Identification (RFID), Near Field Communication (NFC) or the like, from a product-identifying tag associated with a corresponding product. In still further related embodiments of the method, identifying products further includes determining a location of the mobile communication device, for example using geo-fencing techniques or the like, and determining the one or more products based on the determined location.

In still further specific embodiments of the method, determining one or more offers further includes determining a product warranty offer and/or a new product offer for one or more of the identified products.

In other specific embodiments of the method, determining one or more offers further comprises determining user-configured offers for one or more of the identified products, such that offer can pre-configure an application to present only the offers they desire, for example merchant-specific or manufacturer-specific offers, specific types of offers, specific savings amounts and the like.

In still further specific embodiments of the method, presenting one or more offer indicators further includes presenting offer indicators that identify a type of offer based on a type of offer indicator.

Moreover, in further embodiments the method may include receiving, at the mobile communication device, a user input that is configured to select an offer for inclusion in an electronic wallet. In additional related embodiments the method may include receiving, at the mobile communication device, a user input that is configured to select an offer for presentation of further details associated with the offer. While in still further related embodiments the method may include receiving, at the mobile communication device, a user input that is configured to select an offer for online purchase of the product and redemption of the offer or receiving, at the mobile communication device, a user input that is configured to select an offer for initiating an electronic wallet transaction for purchasing the product and redeeming the offer at a currently located retailer.

An apparatus for providing product offers defines second embodiments of the invention. The apparatus includes a computing platform including a processor, a memory in communication with a processor. The apparatus further includes product identification application stored in the memory, executable by the processor and configured to identify one or more products proximate in location to the mobile communication device. In addition, the apparatus includes offer determination application stored in the memory, executable by the processor and configured to determine one or more offers, each offer associated with one or more of the identified products. Additionally, the apparatus includes an offer presentation application stored in the memory, executable by the processor and configured to present, within a display of the live video stream on the mobile communication device, one or more offer indicators, each offer indicator associated with a determined offer and presented proximate in location to display of a corresponding product.

A computer program product defines third embodiments of the invention. The computer program product includes a non-transitory computer-readable medium having computer-executable instructions. The instructions cause a computer to implement the steps of (1) identifying one or more products proximate in location to the mobile communication device, (2) determining one or more offers, each offer associated with one or more of the identified products, and (3) presenting, within a display of the live video stream on the mobile communication device, one or more offer indicators, each offer indicator associated with a determined offer and presented proximate in location to display of a corresponding product.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
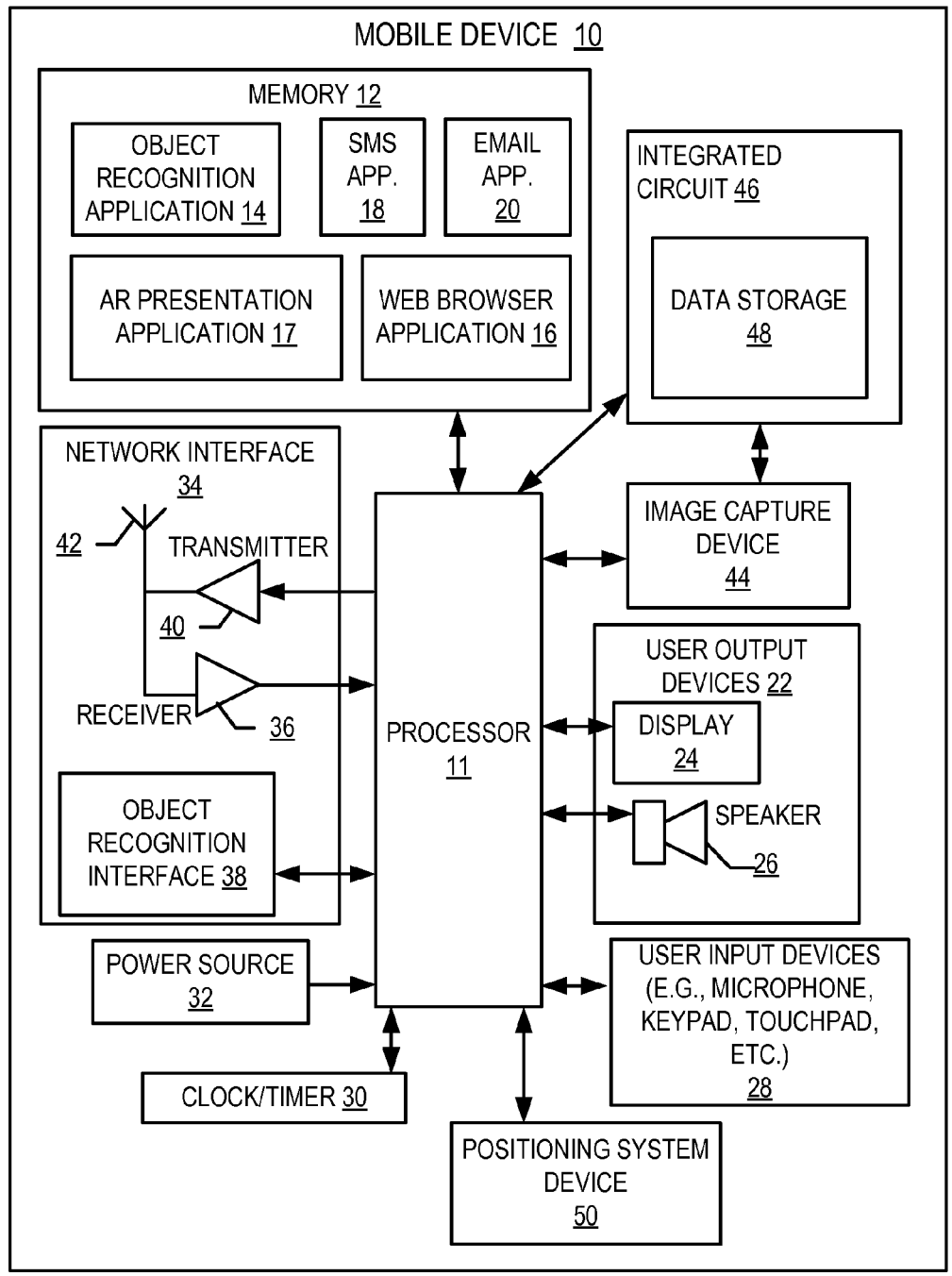
Figure 2:
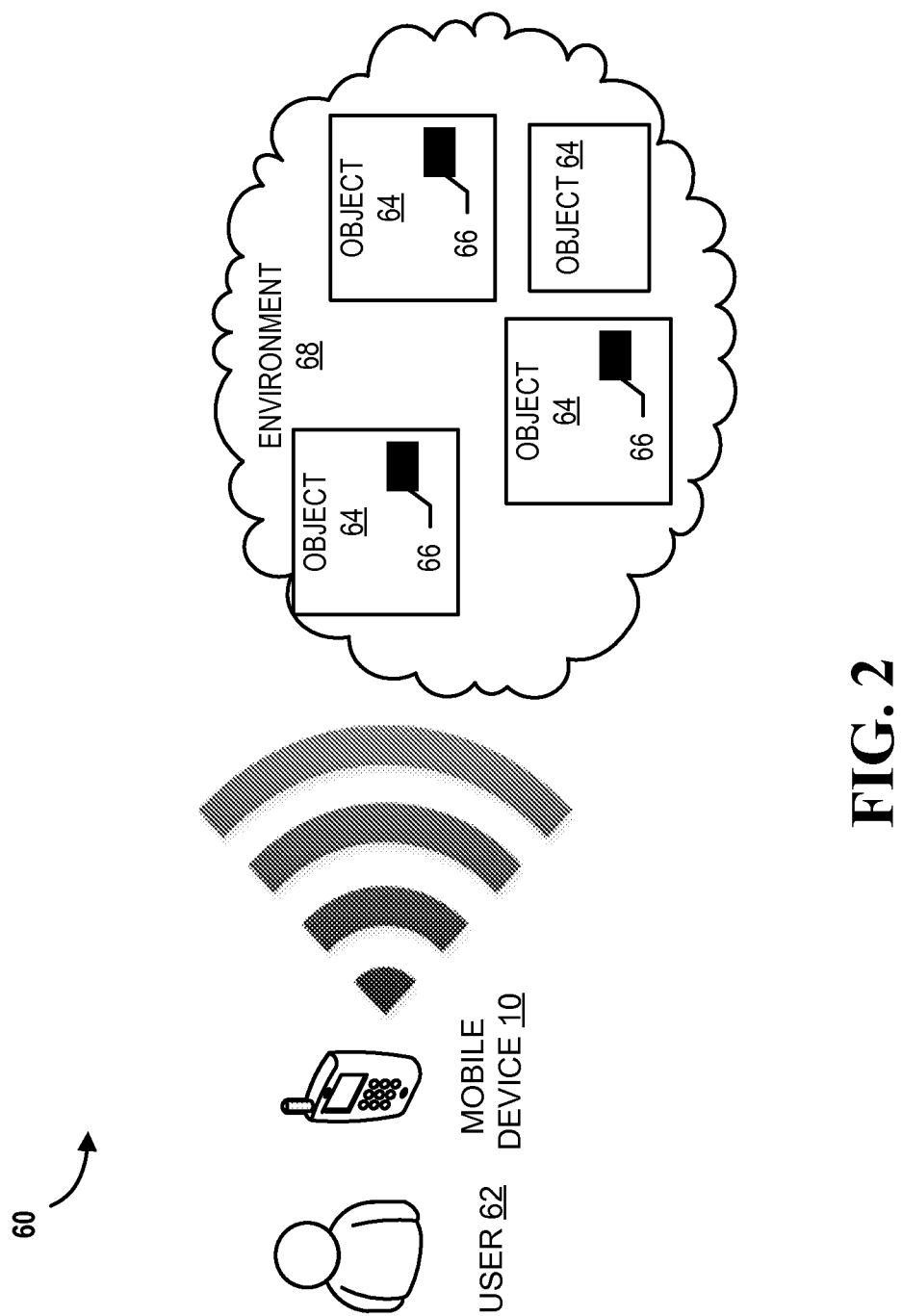
Figure 3:
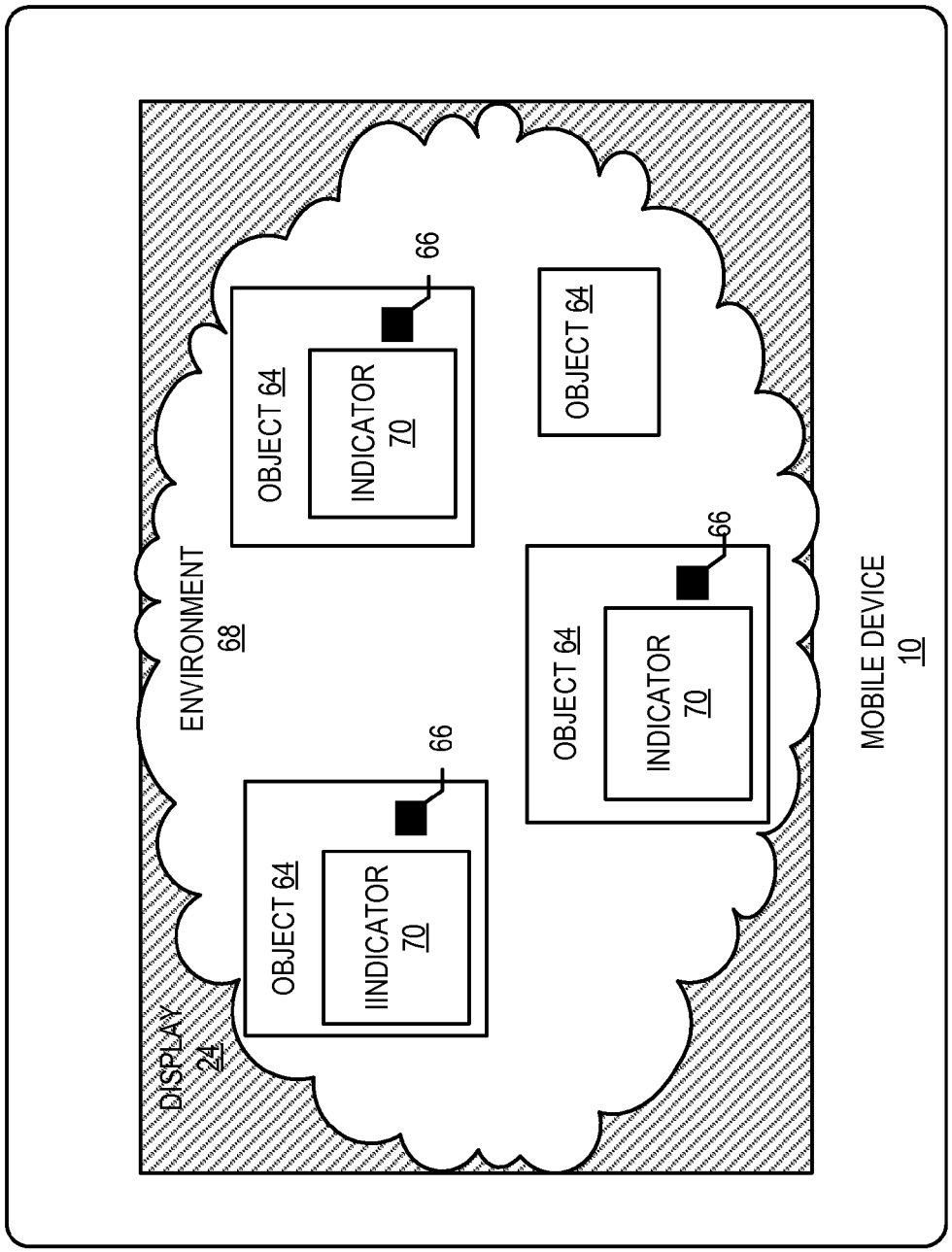
Figure 4:
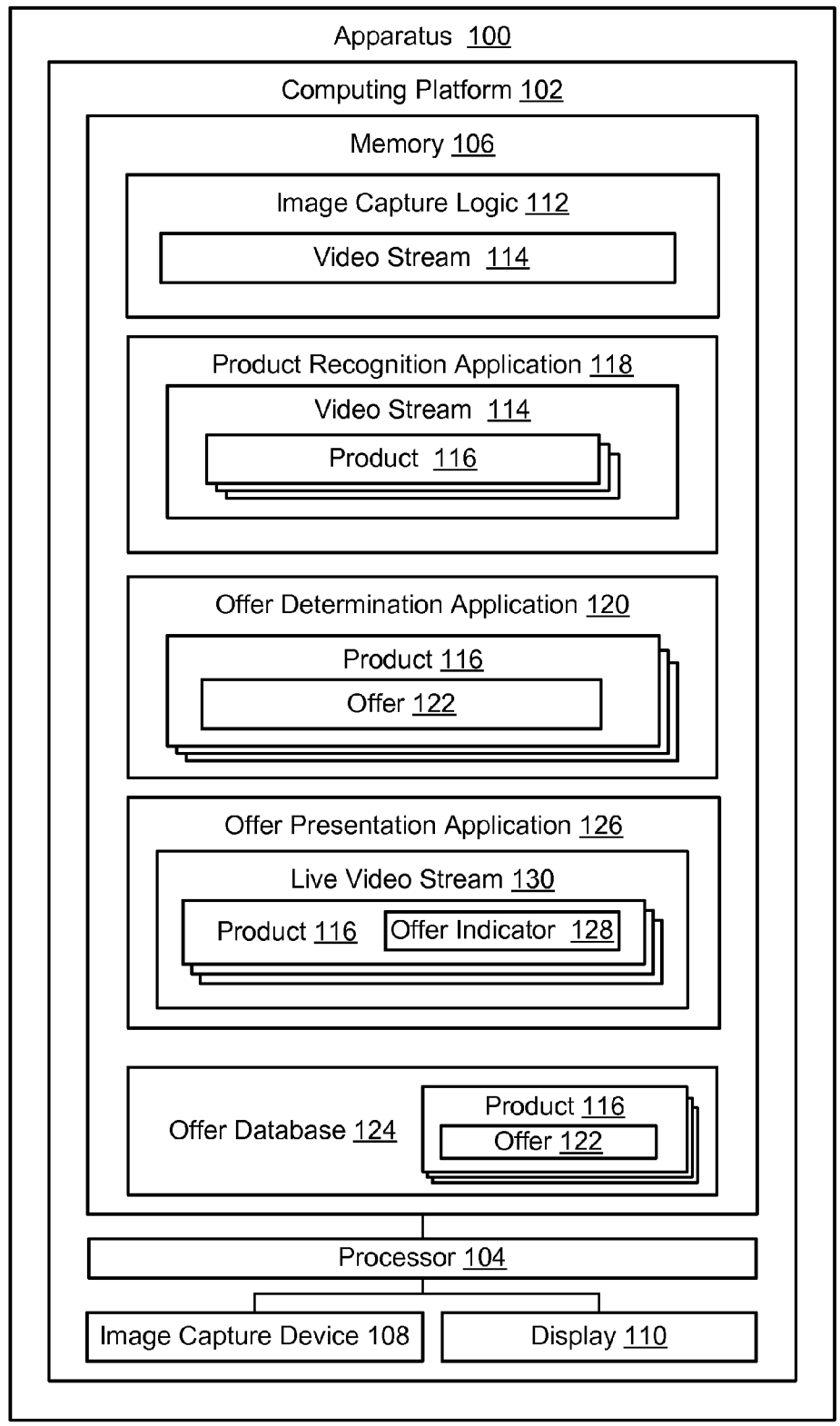
Figure 5:
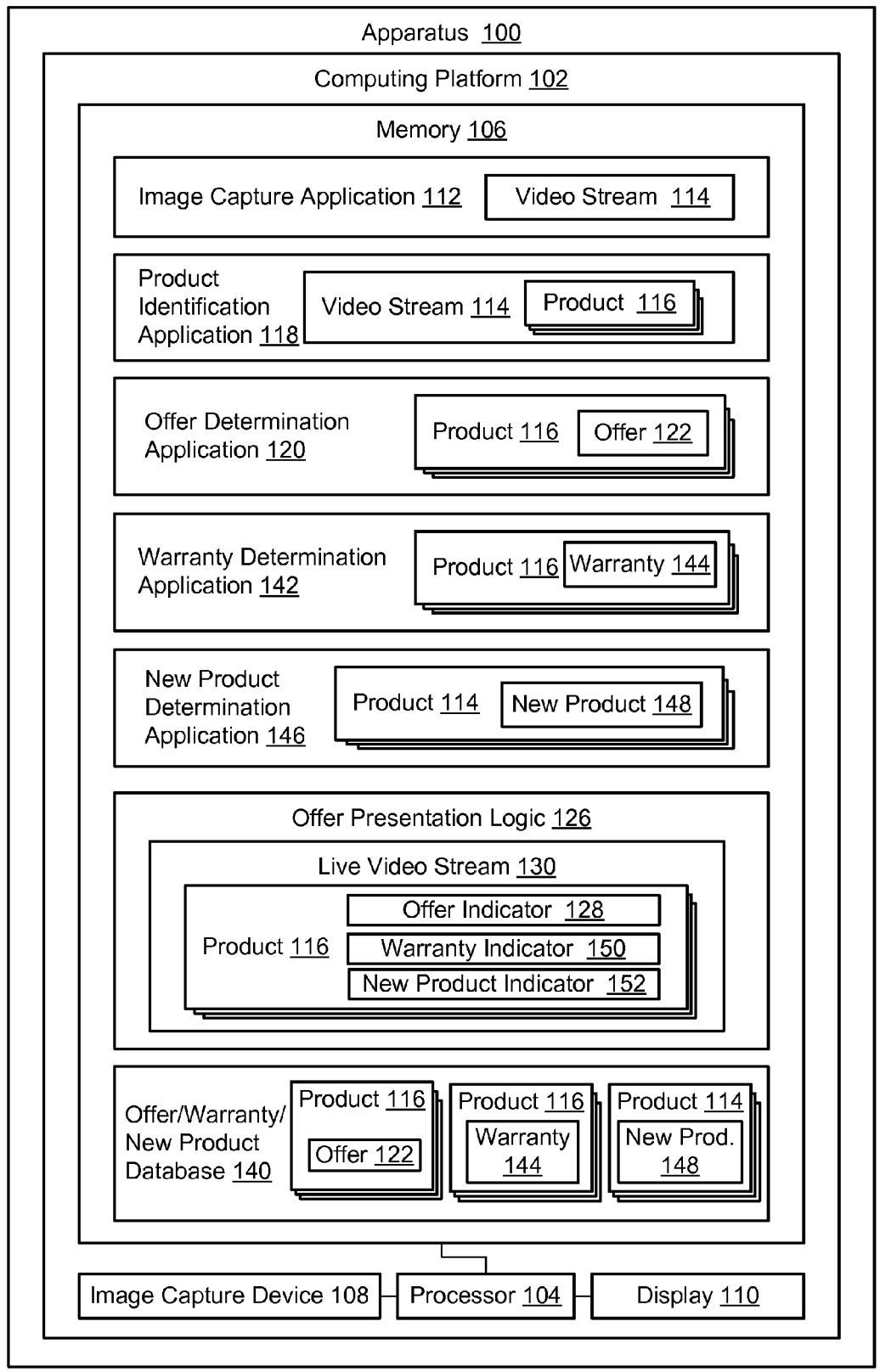
Figure 6:
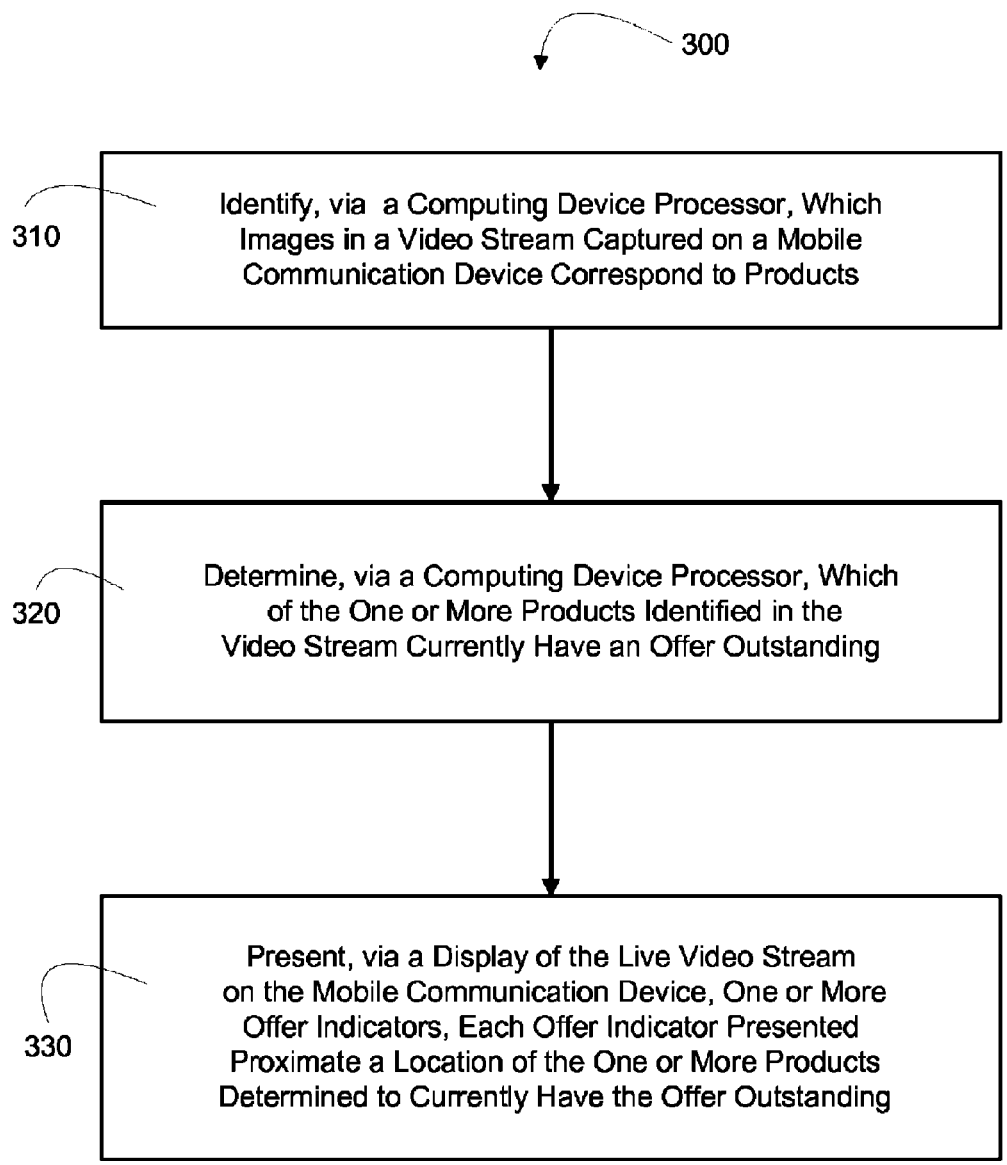

Having thus described embodiments of the invention in general terms, reference will now be made to the accompanying drawings, which are not necessarily drawn to scale, and wherein:

FIG. 1 is a block diagram illustrating a mobile device, in accordance with an embodiment of the invention;

FIG. 2 is a block diagram illustrating an object recognition environment, in accordance with an embodiment of the invention;

FIG. 3 is a block diagram illustrating a mobile device, in accordance with an embodiment of the invention;

FIG. 4 is a block diagram of an apparatus configured to present product offers in conjunction with display of the product in a live video stream on a mobile communication device, in accordance with embodiment of the present invention;

FIG. 5 is an additional block diagram of an apparatus configured to present product offers, warranty offers and new product offers/information in conjunction with display of the product in a live video stream on a mobile communication device, in accordance with embodiment of the present invention; and FIG. 6 is a flow diagram illustrating a method for presenting product offers in conjunction with display of the product in a live video stream on a mobile communication device, in accordance with embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods, systems, computer programs and the like are herein disclosed that provide for presenting product offers on mobile communication devices and, specifically presenting product offers in conjunction with a live video stream. Specific embodiments of the invention rely on presenting product offers in an augmented reality environment, or more generally referred to as mediated reality, in which the offers are shown as being associated with an object in the live video stream.

One such example of an AR application platform is Layar, available from Layar, Amsterdam, the Netherlands. The Layar platform technology analyzes location data, compass direction data, and the like in combination with information related to the objects, locations or the like in the video stream to create browse-able "hot-spots" or "tags" that are superimposed on the mobile device display, resulting in an experience described as "reality browsing".

FIG. 1 illustrates an embodiment of a mobile device 10 that may be configured to execute object recognition and Augmented Reality (AR) functionality, in accordance with specific embodiments of the present invention. A "mobile device" 10 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like.

The mobile device 10 may generally include a processor 11 communicably coupled to such devices as a memory 12, user output devices 22, user input devices 28, a network interface 34, a power source 32, a clock or other timer 30, an image capture device 44, a positioning system device 50 (e.g., a Global Positioning System (GPS) device), one or more integrated circuits 46, etc.

In some embodiments, the mobile device and/or the server access one or more databases or data stores (not shown in FIG. 1) to search for and/or retrieve information related to the object and/or marker. In some embodiments, the mobile device and/or the server access one or more data stores local to the mobile device and/or server and in other embodiments, the mobile device and/or server access data stores remote to the mobile device and/or server. In some embodiments, the mobile device and/or server access both a memory and/or data store local to the mobile device and/or server as well as a data store remote from the mobile device and/or server The processor 11, and other processors described herein, may generally include circuitry for implementing communication and/or logic functions of the mobile device 10. For example, the processor 11 may include a digital signal processor device, a microprocessor device, and various analog to digital converters, digital to analog converters, and/or other support circuits. Control and signal processing functions of the mobile device 10 may be allocated between these devices according to their respective capabilities. The processor 11 thus may also include the functionality to encode and interleave messages and data prior to modulation and transmission. The processor 11 may additionally include an internal data modem. Further, the processor 11 may include functionality to operate one or more software programs or applications, which may be stored in the memory 12. For example, the processor 11 may be capable of operating a connectivity program, such as a web browser application 16. The web browser application 16 may then allow the mobile device 10 to transmit and receive web content, such as, for example, location-based content and/or other web page content, according to a Wireless Application Protocol (WAP), Hypertext Transfer Protocol (HTTP), and/or the like.

The processor 11 may also be capable of operating applications, such as an object recognition application 14. The object recognition application 14 may be downloaded from a server and stored in the memory 12 of the mobile device 10. Alternatively, the object recognition application 14 may be pre-installed and stored in a memory in the integrated circuit 46. In such an embodiment, the user may not need to download the object recognition application 14 from a server. In some embodiments, the processor 11 may also be capable of operating one or more applications, such as one or more applications functioning as an artificial intelligence ("AI") engine. The processor 11 may recognize objects that it has identified in prior uses by way of the AI engine. In this way, the processor 11 may recognize specific objects and/or classes of objects, and store information related to the recognized objects in one or more memories and/or databases discussed herein. Once the AI engine has thereby "learned" of an object and/or class of objects, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module of the mobile device and/or server, an indication that the object may be the same object previously recognized. In this regard, the AI engine may provide a baseline or starting point from which to determine the nature of the object. In other embodiments, the AI engine's recognition of an object is accepted as the final recognition of the object.

The integrated circuit 46 may include the necessary circuitry to provide the object recognition functionality to the mobile device 10. Generally, the integrated circuit 46 will include data storage 48 which may include data associated with the objects within a video stream that the object recognition application 14 identifies as having a certain marker(s) (discussed in relation to FIG. 2). The integrated circuit 46 and/or data storage 48 may be an integrated circuit, a microprocessor, a system-on-a-integrated circuit, a microcontroller, or the like. As discussed above, in one embodiment, the integrated circuit 46 may provide the functionality to the mobile device 10.

Of note, while FIG. 1 illustrates the integrated circuit 46 as a separate and distinct element within the mobile device 10, it will be apparent to those skilled in the art that the object recognition functionality of integrated circuit 46 may be incorporated within other elements in the mobile device 10. For instance, the functionality of the integrated circuit 46 may be incorporated within the mobile device memory 12 and/or processor 11. In a particular embodiment, the functionality of the integrated circuit 46 is incorporated in an element within the mobile device 10 that provides object recognition capabilities to the mobile device 10. Still further, the integrated circuit 46 functionality may be included in a removable storage device such as an SD card or the like.

The processor 11 may be configured to use the network interface 34 to communicate with one or more other devices on a network. In this regard, the network interface 34 may include an antenna 42 operatively coupled to a transmitter 40 and a receiver 36 (together a "transceiver"). The processor 11 may be configured to provide signals to and receive signals from the transmitter 40 and receiver 36, respectively. The signals may include signaling information in accordance with the air interface standard of the applicable cellular system of the wireless telephone network that may be part of the network. In this regard, the mobile device 10 may be configured to operate with one or more air interface standards, communication protocols, modulation types, and access types. By way of illustration, the mobile device 10 may be configured to operate in accordance with any of a number of first, second, third, and/or fourth-generation communication protocols and/or the like. For example, the mobile device 10 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 10 may also be configured to operate in accordance with non-cellular communication mechanisms, such as via a wireless local area network (WLAN) or other communication/data networks.

The network interface 34 may also include an object recognition interface 38 in order to allow a user to execute some or all of the above-described processes with respect to the object recognition application 14 and/or the integrated circuit 46. The object recognition interface 38 may have access to the hardware, e.g., the transceiver, and software previously described with respect to the network interface 34. Furthermore, the object recognition interface 38 may have the ability to connect to and communicate with an external data storage on a separate system within the network as a means of recognizing the object(s) in the video stream.

As described above, the mobile device 100 may have a user interface that includes user output devices 22 and/or user input devices 28. The user output devices 22 may include a display 24 (e.g., a liquid crystal display (LCD) or the like) and a speaker 26 or other audio device, which are operatively coupled to the processor 11. The user input devices 28, which may allow the mobile device 10 to receive data from a user, may include any of a number of devices allowing the mobile device 10 to receive data from a user, such as a keypad, keyboard, touch-screen, touchpad, microphone, mouse, joystick, other pointer device, button, soft key, and/or other input device(s).

The mobile device 10 may further include a power source 32. Generally, the power source 32 is a device that supplies electrical energy to an electrical load. In one embodiment, power source 32 may convert a form of energy such as solar energy, chemical energy, mechanical energy, etc. to electrical energy. Generally, the power source 32 in a mobile device 10 may be a battery, such as a lithium battery, a nickel-metal hydride battery, or the like, that is used for powering various circuits, e.g., the transceiver circuit, and other devices that are used to operate the mobile device 10. Alternatively, the power source 32 may be a power adapter that can connect a power supply from a power outlet to the mobile device 10. In such embodiments, a power adapter may be classified as a power source "in" the mobile device.

The mobile device 10 may also include a memory 12 operatively coupled to the processor 11. As used herein, memory may include any computer readable medium configured to store data, code, or other information. The memory 12 may include volatile memory, such as volatile Random Access Memory (RAM) including a cache area for the temporary storage of data. The memory 12 may also include non-volatile memory, which can be embedded and/or may be removable. The non-volatile memory may additionally or alternatively include an electrically erasable programmable read-only memory (EEPROM), flash memory or the like.

The memory 12 may store any of a number of applications or programs which comprise computer-executable instructions/code executed by the processor 11 to implement the functions of the mobile device 10 described herein. For example, the memory 12 may include such applications as an object recognition application 14, an augmented reality (AR) presentation application 17 (described infra. in relation to FIG. 3), a web browser application 16, a Short Message Service (SMS) application 18, an electronic mail (i.e., email) application 20, etc.

Referring to FIG. 2, a block diagram illustrating an object recognition experience 60 in which a user 62 utilizes a mobile device 10 to capture a video stream that includes an environment 68 is shown. As denoted earlier, the mobile device 10 may be any mobile communication device. The mobile device 10 has the capability of capturing a video stream of the surrounding environment 68. The video capture may be by any means known in the art. In one particular embodiment, the mobile device 10 is a mobile telephone equipped with an image capture device 44 capable of video capture.

The environment 68 contains a number of objects 64. Some of such objects 64 may include a marker 66 identifiable to an object recognition application that is either executed on the mobile device 10 or within the wireless network. A marker 66 may be any type of marker that is a distinguishing feature that can be interpreted by the object recognition application to identify specific objects 64. For instance, a marker 66 may be alpha-numeric characters, symbols, logos, shapes, ratio of size of one feature to another feature, a product identifying code such as a bar code, electromagnetic radiation such as radio waves (e.g., radio frequency identification (RFID)), architectural features, color, etc. In some embodiments, the marker 66 may be audio and the mobile device 10 may be capable of utilizing audio recognition to identify words or unique sounds broadcast. The marker 66 may be any size, shape, etc. Indeed, in some embodiments, the marker 66 may be very small relative to the object 64 such as the alpha-numeric characters that identify the name or model of an object 64, whereas, in other embodiments, the marker 66 is the entire object 64 such as the unique shape, size, structure, etc.

In some embodiments, the marker 66 is not actually a physical marker located on or being broadcast by the object. For instance, the marker 66 may be some type of identifiable feature that is an indication that the object 64 is nearby (e.g., a tag or placard near the object). In some embodiments, the marker 66 for an object 64 may actually be the marker 66 for a different object 64. For example, the mobile device 10 may recognize a particular building as being "Building A." Data stored in the object recognition data storage may indicate that "Building B" is located directly to the east and next to "Building A." Thus, markers 66 for an object 64 that are not located on or being broadcast by the object 64 are generally based on fixed facts about the object 64 (e.g., "Building B" is next to "Building A"). However, it is not a requirement that such a marker 66 be such a fixed fact. The marker 66 may be anything that enables the mobile device 10 to interpret to a desired confidence level what the object is. For another example, the mobile device 10 may identify a particular clown character as Ronald McDonald® and utilize the information that Ronald McDonald® is nearby to interpret that a large purple mass next to Ronald McDonald® is Grimace® or that a human-sized hamburger nearby is Mayor McCheese®, whereas without the identification of Ronald McDonald®, the purple mass and giant hamburger would not be identified by the mobile device 10.

The marker 66 may also be or include social network data, such as data retrieved or communicated from the Internet, such as tweets, blog posts, Facebook posts, various types of messages and/or the like. In other embodiments, the marker 66 is provided in addition to social network data as mentioned above. For example, the mobile device 10 may capture a video stream and/or one or more still shots including a large gathering of people. In an example, a person dressed in a Santa Claus costume and multiple people dressed as elves are present. The mobile device 10 may identify several social network indicators, such as posts, blogs, tweets, messages, and/or the like indicating the presence of Santa Claus at the mall. In this way, the mobile device 10 may communicate information regarding the social media communications to the user and/or use the information regarding the social media communications in conjunction with other methods of object recognition. For example, the mobile device and/or server performing recognition of Santa Claus at the mall may confirm that the object being identified is Santa Claus based on retrieved social media communications.

In some embodiments, the mobile device and/or server access one or more other servers, social media networks, applications and/or the like in order to retrieve and/or search for information useful in performing an object recognition. In some embodiments, the mobile device and/or server accesses another application by way of an application programming interface or API. In this regard, the mobile device and/or server may quickly search and/or retrieve information from the other program without requiring additional authentication steps or other gateway steps.

While FIG. 2 illustrates that the objects 64 with markers 66 only include a single marker 66, it will be appreciated that the object 64 may have any number of markers 66 with each equally capable of identifying the object 66. Similarly, multiple markers 64 may be identified by the mobile device 100 such that the combination of the markers 66 may be utilized to identify the object 64. For example, the mobile device 10 may utilize facial recognition markers 66 to identify a person as either "Clark Kent" or Superman® and utilize a separate marker 66 such as a red cape to confirm the identification to the desired confidence level that the person is Superman®.

In some embodiments, a marker 66 may be the location of the object 64. In such embodiments, the mobile device 10 may utilize Global Positioning System (GPS) hardware and/or software or some other location determining mechanism to determine the location of the user 62 and/or object 64. As noted above, a location-based marker 66 could be utilized in conjunction with other non-location-based markers 66 identifiable and recognized by the mobile device 10 to identify the object 64. However, in some embodiments, a location-based marker may be the only marker 66. For instance, in such embodiments, the mobile device 10 may utilize GPS software to determine the location of the user 62 and a compass device or software to determine what direction the mobile device 10 is facing in order to identify the object 64. In still further embodiments, the mobile device 10 does not utilize any GPS data in the identification. In such embodiments, markers 66 utilized to identify the object 64 are not location-based.

FIG. 3 illustrates a mobile device 10, specifically the display 24 of the mobile 10, wherein the device 10 has executed an object recognition application 14 and an AR presentation application 17 to present within the display 24 indications of recognized objects within the live video stream (i.e., surrounding environment 68). The mobile device 10 is configured to rely on markers 66 to identify objects 64 that are associated with product offers, products with extended warranties, new products and the like, and indicate to the user 62 the identified objects 64 by displaying an indicator 70 on the mobile device display 130 in conjunction with display of the live video stream. As illustrated, if an object 64 does not have any markers 66 (or at least enough markers 66 to yield object identification), the object 64 will be displayed without an associated indicator 70.

The object recognition application 14 may use any type of means in order to identify desired objects 64. For instance, the object recognition application 14 may utilize one or more pattern recognition algorithms to analyze objects in the environment 68 and compare with markers 66 in data storage 48 which may be contained within the mobile device 10 (such as within integrated circuit 46) or externally on a separate system accessible via the connected network. For example, the pattern recognition algorithms may include decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels such as Bayesian networks and Markov random fields, ensemble learning algorithms such as bootstrap aggregating, boosting, ensemble averaging, combinations thereof, and the like.

Upon identifying an object 64 within the real-time video stream, the AR presentation application 17 is configured to superimpose an indicator 70 on the mobile device display 24. The indicator 70 is generally a graphical representation that highlights or outlines the object 64 and may be activatable (i.e., include an embedded link), such that the user 62 may "select" the indicator 70 and retrieve information related to the identified object. The information may include any desired information associated with the selected object and may range from basic information to greatly detailed information. In some embodiments, the indicator 70 may provide the user 62 with an internet hyperlink to further information on the object 64. The information may include, for example, all types of media, such as text, images, clipart, video clips, movies, or any other type of information desired. In yet other embodiments, the indicator 70 information related to the identified object may be visualized by the user 62 without "selecting" the indicator 70.

In embodiments in which the indicator 70 provides an interactive tab to the user 62, the user 62 may select the indicator 70 by any conventional means, e.g., keystroke, touch, voice command or the like, for interaction with the mobile device 10. For instance, in some embodiments, the user 62 may utilize an input device 28 such as a keyboard to highlight and select the indicator 70 in order to retrieve the information. In a particular embodiment, the mobile device display 24 includes a touch screen that the user may employ to select the indicator 70 utilizing the user's finger, a stylus, or the like.

In some embodiments, the indicator 70 is not be interactive and simply provides information to the user 62 by superimposing the indicator 70 onto the display 24. For example, in some instances it may be beneficial for the AR presentation application 17 to merely identify an object 64, e.g., just identify the object's name/title, give brief information about the object, etc., rather than provide extensive detail that requires interaction with the indicator 70. The AR presentation application 17 is capable of being tailored to a user's desired preferences.

Furthermore, the indicator 70 may be displayed at any size on the mobile device display 24. The indicator 70 may be small enough that it is positioned on or next to the object 64 being identified such that the object 64 remains discernable behind the indicator 70. Additionally, the indicator 70 may be semi-transparent or an outline of the object 64, such that the object 64 remains discernable behind or enclosed by the indicator 70. In other embodiments, the indicator 70 may be large enough to completely cover the object 64 portrayed on the display 24. Indeed, in some embodiments, the indicator 70 may cover a majority or the entirety of the mobile device display 24.

The user 62 may opt to execute the object recognition application 14 and AR presentation application 17 at any desired moment and begin video capture and analysis. However, in some embodiments, the object recognition application 14 and AR presentation application 17 includes an "always on" feature in which the mobile device 10 is continuously capturing video and analyzing the objects 64 within the video stream. In such embodiments, the object recognition application 14 may be configured to alert the user 62 that a particular object 64 has been identified. The user 62 may set any number of user preferences to tailor the object recognition and AR presentation experience to their needs. For instance, the user 62 may opt to only be alerted if a certain particular object 64 is identified. Additionally, it will be appreciated that the "always on" feature in which video is continuously captured may consume the mobile device power source 32 more quickly. Thus, in some embodiments, the "always on" feature may disengage if a determined event occurs such as low power source 32, low levels of light for an extended period of time (e.g., such as if the mobile device 10 is in a user's pocket obstructing a clear view of the environment 68 from the mobile device 10), if the mobile device 10 remains stationary (thus receiving the same video stream) for an extended period of time, the user sets a certain time of day to disengage, etc. Conversely, if the "always on" feature is disengaged due to the occurrence of such an event, the user 62 may opt for the "always on" feature to re-engage after the duration of the disengaging event (e.g., power source 32 is re-charged, light levels are increased, etc.).

In some embodiments, the user 62 may identify objects 64 that the object recognition application 14 does not identify and add it to the data storage 48 with desired information in order to be identified and/or displayed in the future. For instance, the user 62 may select an unidentified object 64 and enter a name/title and/or any other desired information for the unidentified object 64. In such embodiments, the object recognition application 14 may detect/record certain markers 66 about the object so that the pattern recognition algorithm(s) (or other identification means) may detect the object 64 in the future. Furthermore, in cases where the object information is within the data storage 48, but the object recognition application 14 fails to identify the object 64 (e.g., one or more identifying characteristics or markers 66 of the object has changed since it was added to the data storage 48 or the marker 66 simply was not identified), the user 62 may select the object 64 and associate it with an object 64 already stored in the data storage 48. In such cases, the object recognition application 14 may be capable of updating the markers 66 for the object 64 in order to identify the object in future video streams.

In addition, in some embodiments, the user 62 may opt to edit the information or add to the information provided by the indicator 70. For instance, the user 62 may opt to include user-specific information about a certain object 64 such that the information may be displayed upon a future identification of the object 64. Conversely, in some embodiments, the user may opt to delete or hide an object 64 from being identified and an indicator 70 associated therewith being displayed on the mobile device display 24.

Furthermore, in some instances, an object 64 may include one or more markers 66 identified by the object recognition application 14 that leads the object recognition application 14 to associate an object with more than one objects in the data storage 48. In such instances, the user 62 may be presented with multiple candidate identifications and may opt to choose the appropriate identification or input a different identification. The multiple candidates may be presented to the user 62 by any means. For instance, in one embodiment, the candidates are presented to the user 62 as a list wherein the "strongest" candidate is listed first based on reliability of the identification. Upon input by the user 62 identifying the object 64, the object recognition application 14 may "learn" from the input and store additional markers 66 in order to avoid multiple identification candidates for the same object 64 in future identifications.

Additionally, the object recognition application 14 may utilize other metrics for identification than identification algorithms. For instance, the object recognition application 14 may utilize the user's location, time of day, season, weather, speed of location changes (e.g., walking versus traveling), "busyness" (e.g., how many objects are in motion versus stationary in the video stream), as well any number of other conceivable factors in determining the identification of objects 64. Moreover, the user 62 may input preferences or other metrics for which the object recognition application 14 may utilize to narrow results of identified objects 64.

In some embodiments, the AR presentation application 17 may have the ability to gather and report user interactions with displayed indicators 70. The data elements gathered and reported may include, but are not limited to, number of offer impressions; time spent "viewing" an offer, product, object or business; number of offers investigated via a selection; number of offers loaded to an electronic wallet and the like. Such user interactions may be reported to any type of entity desired. In one particular embodiment, the user interactions may be reported to a financial institution and the information reported may include customer financial behavior, purchase power/transaction history, and the like.

In various embodiments, information associated with or related to one or more objects that is retrieved for presentation to a user via the mobile device may be permanently or semi-permanently associated with the object. In other words, the object may be "tagged" with the information. In some embodiments, a location pointer is associated with an object after information is retrieved regarding the object. In this regard, subsequent mobile devices capturing the object for recognition may retrieve the associated information, tags and/or pointers in order to more quickly retrieve information regarding the object. In some embodiments, the mobile device provides the user an opportunity to post messages, links to information or the like and associate such postings with the object. Subsequent users may then be presenting such postings when their mobile devices capture and recognize an object. In some embodiments, the information gathered through the recognition and information retrieval process may be posted by the user in association with the object. Such tags and/or postings may be stored in a predetermined memory and/or database for ease of searching and retrieval.

Referring to FIG. 4, an apparatus 100 configured for presenting product offers in a live video stream, in accordance with embodiments of the present invention. The apparatus includes a computing platform 102 having a processor 104 and a memory 106 in communication with the processor. Additionally, apparatus 100 includes image capture device 108 and display 110 both in communication with processor 104.

It should be noted that the apparatus 100 may include more than one computing device. For example, apparatus 100 may include a mobile communication device and a network device, which operate in unison to present product offers in a live video stream displayed on a display of the mobile communication device. Thus, the logic shown and described in apparatus 100 may reside and be executed on a mobile communication device or a network device that is in wireless communication with the mobile communication device. A mobile communication device may be a mobile cellular telephone, such as a smart phone or the like, a Personal Data Assistant (PDA) a tablet computing device, a laptop device or any other computing device having an image capture device 108 and a display 110. It should be noted that while many embodiments of the mobile communication device are personal and/or handheld devices, in other embodiments of the invention a mobile communication device may be permanently or temporarily located within a moving vehicle, such as an automobile or the like.

The memory 106 of apparatus 100 includes image capture logic 112 that is in communication with image capture device 108 and configured to capture a video stream 114. It should be noted that the video stream 114 may be captured from various different environments. For example, the video stream 114 may be captured while shopping in a retail location, such as an aisle of a grocery store, department store, home improvement store or the like. In addition, the video stream 114 may be captured in the user residence, such as video of the contents of a pantry, cupboard, storage area, a refrigerator or the like. In other embodiments, the video stream 114 may be captured while watching media, such as television, Internet or the like, reading media, such as via the Internet, a billboard advertisement, magazine, newspaper or the like.

The memory 106 of apparatus 100 additionally includes product identification application 118 (which may take the form of object recognition application 14 shown in FIG. 1) that is configured to identify one or more products 116 in the video stream 114. For purposes of this disclosure, products 116 may include products, services and entities associated with products or services, such as business entities, manufacturers or the like. As previously discussed, the product identification application 118 may implement any known or future known identification mechanisms. For example, product identification application may implement image recognition techniques based on characteristics, indicia (e.g., Optical Character Recognition (OCR) or the like), logos, shapes and the like associated with a product. In addition, in those embodiments in which the products or tags displayed in conjunction with the products include a visually readable code, such as Quick Response (QR) code, bar code or the like, the object recognition application 14 may be implemented to decipher the code to identify the product.

In other embodiments of the invention, the product identification application 118 may identify the one or more products 116 based on the geographic location of the products or information communicated from the products. In such embodiments, the product identification application 118 may be configured to identify products 116 by implementing geo-fencing techniques or any other spatial technique. In other such embodiments, the object recognition application 14 may be configured to sense and receive short range communication, such as via Near Field Communication (NFC), Radio Frequency Identification (RFID), Bluetooth® or the like, which includes identification of the products. Since product identification based on location and/or information communicated from the products does not rely on an image for identification, such identification may be lieu of or implemented in combination with visual identification techniques described above.

The memory 106 of apparatus 100 additionally includes offer determination application 120 configured to determine if an identified product 116 currently has an offer 122 outstanding. Thus, offer determination application 120 is in communication with offer database 124 which stores current offers 122 for products 114. It should be noted that the term "offer" as used and claimed herein includes discounts, coupons, price reduction, trial offers, subscriptions, personalization, referrals, bundles, time-based offers, location-based offers, or other offers related to the product, such as two-for-one/buy-one-get-one-free offers, rebates and the like. The offer determination application 120 may be configured by the user or by the entity providing for the offer program. For example, the user may configure the apparatus 100 such that only offers 122 of a certain type are determined, such as offers for a specific product, a specific brand of product, a specific provider/retailer of the product, a specific timeframe, a specific product size, a specific product quantity, specific geographic zones, or the like. In this way, the apparatus 100 may be configured with a rules based engine. In additional embodiments, the entity providing the offer program may configure the apparatus 100 such that only offers 122 from predetermined manufacturers and/or retailers are determined, such as manufacturers and/or retailers that are affiliated or otherwise have a relationship with the entity providing the offer program.

The memory 106 of apparatus 100 additionally includes offer presentation application 126 (which mat take the form of AR presentation application 17 shown in FIG. 1) that is configured to present one or more offer indicators 128, on a display of mobile communication device, each offer indicator 128 presented in a live video stream 130 proximate a location of the one or more products 116 determined to currently have offers 122.

In some embodiments, the information provided by the real-time video stream may be compared to data provided to the system through an API. In this way, the data may be stored in a separate API and be implemented by request from the mobile device and/or server accesses another application by way of an API.

In one embodiment of the invention the offer indicator 128 may be a graphical tag, highlighted area or an outline around the border of the product 116 as displayed in the live video stream 130. The user of the mobile communication device may activate the offer indicator 128, through touch, mouse-pointer click, keypad, voice command or the like, to display further information regarding the offer 122 (e.g., offer details, expiration date, terms and conditions and the like), download the offer to their mobile communication device for subsequent use during the transaction and/or initiate network communication with a website or the like for applying the offer 122 and/or conducting a transaction to purchase the product 116.

In specific embodiments of the invention, the user of the mobile communication may be actively "looking" for offers by positioning the image capture device 108 in front of products 114 so as to capture the video stream 114, subsequently identify the products, determine if offers are associated with the products and present the offer indicators 128 in the live video stream 130 that the user is viewing. For example, the user positions the mobile device to scan the aisle of a grocery store or their pantry within their residence. In other embodiments of the invention, the user may not be actively "looking" for offers, but the image capture device 108 may be automatically "looking" for offers through the use of a software agent and/or algorithm.

In other specific embodiments of the invention, the user may be passively "looking" for offers, such as when the apparatus 100 has been configured to search for user-specified offers or the like. In such a passive mode, the mobile communication device may be in a continuously-on mode and/or automatically turned on and off on a predetermined periodical schedule (i.e., intermittent mode). In the passive mode, determination and presentation of an offer may require that the user be prompted to notify the user of the offer. The prompt may include communicating an alert to the user, such as an audio alert communicated from the mobile communication device, e.g., an audible alarm or the like, and/or a visual alert, e.g., display of a flashing light on the mobile communication device or the like.

FIG. 5 is an additional block diagram of an apparatus 100 configured for presenting product offers in a live video stream, in accordance with embodiments of the present invention. In addition to highlighting and describing further details of the invention, FIG. 5 provides for alternate embodiments of the invention. The apparatus 100 includes a computing platform 102 having at least one processor 104 and a memory 106 in communication with the processor. Memory 106 may be resident on mobile communication device or at least a portion of memory 106 may be remote memory that is network accessible to a mobile communication device, for example, at least a portion of memory 106 may reside on servers or the like as part of the offer providing entity's network. Memory 106 may comprise volatile and nonvolatile memory such as read-only and/or random-access memory (RAM and ROM), EPROM, EEPROM, flash cards, or any memory common to computing platforms. Further, memory 106 may include one or more flash memory cells, or may be any secondary or tertiary storage device, such as magnetic media, optical media, tape, or soft or hard disk.

Processor 104 may be an application-specific integrated circuit ("ASIC"), or other integrated circuit set, processor, logic circuit, or other data processing device. Processor 104 or other processor such as an Application Specific Integrated Circuit (ASIC) may execute an application programming interface ("API") layer (not shown in FIG. 5) that interfaces with any resident programs or modules, such as product identification application 118, offer determination application 120, and product determination application 130 stored in the memory 106 of the apparatus 100.

Processor 104 may include various processing subsystems (not shown in FIG. 5) embodied in hardware, firmware, software, and combinations thereof, that enable the functionality of apparatus 100 and the operability of the apparatus 100 on a network. For example, processing subsystems allow for initiating and maintaining communications, and exchanging data, with other networked devices. For the disclosed embodiments, processing subsystems of apparatus 100 may include any subsystem used in conjunction with applications, modules, components and routines described herein.

In some embodiments, the processor 104 may also be capable of operating one or more applications, such as one or more applications functioning as an artificial intelligence ("AI") engine. The processor 104 may recognize objects that it has identified in prior uses by way of the AI engine. In this way, the processor 104 may recognize specific objects and/or classes of objects, and store information related to the recognized objects in one or more memories and/or databases discussed herein. Once the AI engine has thereby "learned" of an object and/or class of objects, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module of the mobile device and/or server, an indication that the object may be the same object previously recognized. In this regard, the AI engine may provide a baseline or starting point from which to determine the nature of the object. In other embodiments, the AI engine's recognition of an object is accepted as the final recognition of the object.

As previously discussed, the memory 106 of apparatus 100 includes image capture logic 112 that is in communication with image capture device 108 and configured to capture a video stream 114. Additionally, memory 106 includes product identification application 118 that is configured to identify one or more products 116 in the video stream 114. For example, product identification application 118 may implement image recognition techniques based on characteristics, indicia (e.g., Optical Character Recognition (OCR) or the like), logos, shapes and the like associated with a product. In addition, in those embodiments in which the products or tags displayed in conjunction with the products include a visually readable code, such as Quick Response (QR) code, bar code or the like, the product identification application 118 may be implemented to decipher the code to identify the product.

The memory 106 of apparatus 100 additionally includes offer determination application 120 configured to determine if an identified product 116 currently has an offer 122 outstanding. Thus, offer determination application 120 is in communication with database 140 which stores current offers 122 for products 116.

Additionally, in specific embodiments of the invention, memory 106 of apparatus 100 includes warranty determination application 142 that is configured to determine if an identified product 116 has an extended warranty offer 144 and/or insurance available. For example, many retailers or financial institutions may offer extended warranties for certain products, such as consumer electronics or the like, that provide for extending the manufacturer's warranty for a designated period of time. Thus, warranty determination application 142 is in communication with database 140, which stores warranty offers 144 for designated products 116 and/or designated retailers.

Moreover, memory 106 of apparatus 100 includes new product determination application 146 that is configured to determine if an identified product is a newly marketed product 148. Many retailers and/or manufacturers may introduce new products to the market and desire to make the consumer aware of the existence of the new product, in addition to making providing offers, such as discounts, coupons or the like, associated with the new product 148. Thus, new product determination application 146 is in communication with database 140, which stores new product information and/or offers 148 for designated products 116.

As previously discussed in relation to FIG. 4, the memory 106 of apparatus 100 additionally includes product offer presentation application 126 that is configured to present one or more offer indicators 128, warranty indicators 150 and/or new product indicators 152, on a display of mobile communication device. Each offer indicator 128, warranty indicators 150 and/or new product indicators 152 is presented in a live video stream 130 proximate a location of the one or more products 116 determined to currently have offers 122, extended warranties 144 and/or new products 148.

In one embodiment of the invention, the offer indicators 128, warranty indicators 150, new product indicators 152 and/or any other indicators which indicate a feature related to the product may be displayed separately. In such embodiments, the user of the mobile communication device may switch between modes to display the information which they are interested in. For example, a first mode may provide for display of offer indicators 128, a second mode may provide for display of warranty indicators 150, a third mode may provide for display of new product indicators 152, a fourth mode may provide for display of other designated product-related indicators and so on. Switching between modes may be configured to occur by any configurable means, such as key activation, touch screen activation, voice command or the like.

In other related embodiments of the invention, two or more of the offer indicators 128, warranty indicators 150, new product indicators 152 and/or any other indicators may be displayed in unison, such that indicators are graphically distinct, such as different colors, highlights, etc and may be configured to overlay one another.

As previously noted, in one embodiment of the invention the offer indicators 128, warranty indicators 150 and/or new product indicators 152 may be a graphical tag, highlighted area, such as specific color or pattern highlighting, or an outline around the border of the product 116 as displayed in the live video stream 130. The user of the mobile communication device may activate the offer indicator 128, warranty indicator 150 or new product indicator 152 through touch, mouse-pointer click, keypad, voice command or the like, to display further information regarding the offer 122, warranty 144 or new product 148.

In one specific embodiment of the invention, the offer indicator 128 may be configured as a dotted-line surrounding the border of the associated product 116. The user may activate the offer indicator 128, such as by touching the display in the area of the product, providing the requisite key stroke or voice command or the like. Upon activation, the offer 122 is automatically downloaded to an offer database, commonly referred to as an electronic offer or coupon wallet (or purse). In one embodiment, upon activation, animated scissors appear on the display that provide for visually clipping the dotted lines representing the offer indicator 128 to affect the download of the offer 122 to the electronic wallet.

In other embodiments of the invention, other indicators, such as a solid line surrounding the border of an associated product 116 may be implemented to indicate that the offer already exists in the user's electronic wallet. In still further embodiments of the invention, other indicators may be implemented to communicate other information about the offer. For example, other indicators may indicate that an offer is nearing expiration, an offer is for a rebate/accretion or the like, an offer is a two-for-one deal or the like. In one specific embodiment of the invention, a blinking offer indicator 128 may indicate that the offer is nearing expiration.

In other embodiments, of the invention activation of the offer indicator 128, warranty indicator 150 and/or new product indicator 152 may provide for the mobile communication device to initiate communication with a network entity, such as a web site or the like, configured for purchasing the product 116, 148 or the extended warranty 144 or providing additional information related to the product 116, 148 or the warranty 144.

Referring to FIG. 6 a flow diagram is depicted of a method 300 for presenting product offers in a live video stream, according to an embodiment of the present invention.

At Event 310, images in a video stream captured on a mobile communication device are identified as corresponding to products offered for sale. Capturing of the video stream may include, for example, a user moving about an aisle within a grocery store or other retailer while positioning the mobile communication device to view, and capture the video stream of, the products on the shelves in the aisle.

In another embodiment of the invention, a user may capture a video stream within their residence, the residence of a friend, family member, or dependent, such as positioning the mobile communication device to view, and capture the video stream of, products within their cupboard/pantry or their refrigerator/freezer or the like, or specific products/appliances within the residence which may need replacement or duplication.

Identifying which images from the video stream are associated with products (including services) may include analyzing the real-time video stream for objects, logos, artwork or other product-indicating features, referred to herein as markers, to identify the images as products. As previously noted, the images may also be identified as products based on coded information, such as QR code, bar code or the like, affixed to proximate to the product. In addition, product identification may utilize Optical Character recognition (OCR), geo-fencing/position location, short range communication (e.g., NFC, RFID or the like) in addition to, or in lieu of, identification of the products based on the images captured on the mobile communication device.

At Event 320, one or more of the identified products are determined to currently have an offer outstanding. The offer may include, but is not limited to a discount, a coupon, social network coupon or discount, a percent or dollar amount off, an extended warranty offer, a rebate, an accretion, participation in new product testing, a new product offer, or the like. Determination of which products have offers outstanding may be implemented by comparing the identified products to database listing of products currently having offers. The stored listing of product offers may be specific to the retail location at which the real-time video stream is being captured or, in other embodiments, the listing or listings of product offers may be specific to retail/merchant locations (physical or online) at which the user of the mobile communication typically shops or from competing retailers/merchants at which the user does not typically shop or a combination of both. In other embodiments, the listing or listings of product offers may be associated with one or more third-party product offer program, such as a financial institution offer program or the like and, thus, in those embodiments in which the offers are not tied to the location of the real-time video stream, such as residential video stream or the like, the offers may be irrespective of which retailer/merchant the user typically uses and/or prefers. It should be noted that in certain embodiments, user configuration may dictate which offers the user's desires and, thus, which databases are accessed for offer matches/searches or which filters are implemented within the databases for determining relevant offers.

At Event 330, one or more indicators are presented on the display of the mobile communication device in conjunction with live video stream. Each of the indicators is presented proximate to a location of a corresponding product determined to currently have an offer outstanding. As previously noted, the indicator may take various forms, such as display of a tag, a highlighted area, a hot-spot or the like. In specific embodiments, the indicator is a selectable indicator, such that a user may select (e.g., click-on, hover-over, touch the display, provide a voice command or the like) the indicator to provide display of specifics related to the offer, downloading the offer to an electronic wallet or accessing a network entity, such as a web site, for purchasing the product. In other embodiments, the indicator itself may provide the offer information or a portion of the offer information.

In other specific embodiments, the indicator may indicate the availability of a current offer/coupon, such as a specific color-code, shading or outlining of the product (e.g., dotted-line outlining the product). The user of the mobile communication device may select (e.g., click-on, hover-over, touch the display, provide a voice command or the like) the indicator to add the offer/coupon to an offer/coupon storage area, referred to herein as an electronic wallet or the like. Coupons/offers that have previously been added to the offer/coupon wallet but have yet to have been redeemed may provide for a different visual indicator than offers/coupons that have yet to be added to the offer/coupon wallet. For example, coupons/offers that have previously been added may be shaded differently than coupons/offers previously added to the coupon/offer wallet or may have a solid-line outlining the product. Other visual indicators may indicate other features of the offer/coupon, such as expirations data, other conditions of the offer/coupon, such as a mail-in offer rebate versus instant discount/rebate, "two for one"/"buy one get one free" offer or the like.

In other specific embodiments, the indicator may indicate the previous coupons or offers that have been obtained by other individuals, not including the user. This way the user may visualize a historical view of the product and determine if better offers were previously available.

In addition to adding the offers/coupons to an electronic coupon/offer wallet it may also be possible to add or otherwise load the offers/coupons to loyalty cards, credit cards, debit cards or the like. In other specific embodiments of the invention, the indicator may provide a link to an online entity, such as an online banking site or online coupon/offer-providing entity site, which is associated with the loyalty card, debit card, credit card or the like and provides for associating accepted offers/coupons with the cards. In other embodiments in which the cards and the mobile communication devices are equipped with near field communication mechanisms or other short range wireless communication means, it may be possible to "touch" the smart card to the mobile communication device to affect wireless communication of the offer/coupon from the mobile communication device to the card (i.e. loading the offer to a mobile wallet (or purse) application on the smart card).

The systems, methods, computer program products, etc. described herein, may be utilized or combined with any other suitable AR-related application. Non-limiting examples of other suitable AR-related applications include those described in the following U.S. Provisional Patent Applications, the entirety of each of which is incorporated herein by reference:

| U.S. Provisional Ser. No. | Filed On | Title |
| --- | --- | --- |
| 61/450,213 | Mar. 8, 2011 | Real-Time Video Image Analysis Applications for Commerce Activity |
| 61/478,412 | Apr. 22, 2011 | Real-Time Video Analysis for Reward Offers |
| 61/478,394 | Apr. 22, 2011 | Real-Time Video Image Analysis for Providing Targeted Offers |
| 61/478,399 | Apr. 22, 2011 | Real-Time Analysis Involving Real Estate Listings |
| 61/478,402 | Apr. 22, 2011 | Real-Time Video Image Analysis for an Appropriate Payment Account |
| 61/478,405 | Apr. 22, 2011 | Presenting Investment-Related Information on a Mobile Communication Device |
| 61/478,393 | Apr. 22, 2011 | Real-Time Image Analysis for Medical Savings Plans |
| 61/478,397 | Apr. 22, 2011 | Providing Data Associated With Relationships Between Individuals and Images |
| 61/478,408 | Apr. 22, 2011 | Identifying Predetermined Objects in a Video Stream Captured by a Mobile Device |
| 61/478,400 | Apr. 22, 2011 | Real-Time Image Analysis for Providing Health Related Information |
| 61/478,411 | Apr. 22, 2011 | Retrieving Product Information From Embedded Sensors Via Mobile Device Video Analysis |
| 61/478,403 | Apr. 22, 2011 | Providing Social Impact Information Associated With Identified Products or Businesses |
| 61/478,407 | Apr. 22, 2011 | Providing Information Associated With an Identified Representation of an Object |
| 61/478,415 | Apr. 22, 2011 | Providing Location Identification of Associated Individuals Based on Identifying the Individuals in Conjunction With a Live Video Stream |
| 61/478,419 | Apr. 22, 2011 | Vehicle Recognition |
| 61/478,417 | Apr. 22, 2011 | Collective Network of Augmented Reality Users |
| 61/508,985 | Jul. 18, 2011 | Providing Information Regarding Medical Conditions |
| 61/508,946 | Jul. 18, 2011 | Dynamically Identifying Individuals From a Captured Image |
| 61/508,980 | Jul. 18, 2011 | Providing Affinity Program Information |
| 61/508,821 | Jul. 18, 2011 | Providing Information Regarding Sports Movements |
| 61/508,850 | Jul. 18, 2011 | Assessing Environmental Characteristics in a Video Stream Captured by a Mobile Device |
| 61/508,966 | Jul. 18, 2011 | Real-Time Video Image Analysis for Providing Virtual Landscaping |
| 61/508,969 | Jul. 18, 2011 | Real-Time Video Image Analysis for Providing Virtual Interior Design |
| 61/508,971 | Jul. 18, 2011 | Real-Time Video Image Analysis for Providing Deepening Customer Value |
| 61/508,764 | Jul. 18, 2011 | Conducting Financial Transactions Based on Identification of Individuals in an Augmented Reality Environment |
| 61/508,973 | Jul. 18, 2011 | Real-Time Video Image Analysis for Providing Security |
| 61/508,976 | Jul. 18, 2011 | Providing Retail Shopping Assistance |
| 61/508,944 | Jul. 18, 2011 | Recognizing Financial Document Images |

Thus, methods, systems, computer programs and the like have been disclosed that provide for presenting product offers in conjunction with a live video stream that includes the product or an object associated with the product. Products may be identified that are proximate to a mobile communication device via object recognition techniques, product codes, wireless communication, location determination or the like. Once products have been identified, related offers are determined and offer indicators are displayed in the live video stream proximate to the display of the product or an object associated with the product. The user can select the offer or offer indicator to receive further information about the offer, download the offer to an electronic wallet, or initiate purchase of the product either online or at the currently located retailer.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for providing product offers for display on a mobile communication device, the method comprising:
    capturing, using an image capture device disposed within the mobile communication device, a live video stream of a surrounding environment that includes one or more products;
    determining, by a computing device processor implementing object recognition processing, that one or more images in the live video stream identify the one or products, wherein object recognition processing provides for identifying the products in the images based on pattern recognition that compares the one or more images to stored markers associated with the products;
    determining, by a computing device processor, one or more offers, each offer associated with one or more of the identified products;
    determining, by a computing device processor, that at least one of the offers is related to a product associated with either a merchant or a manufacturer designated by pre-configuration by the user of the mobile communication device;
    in response to determining that the at least one offer is related to a product associated with either a merchant or a manufacturer designated by pre-configuration by the user,
        retrieving, by a computing device processor, the one or more offers from an offers database; and
        presenting, within the live video stream displayed on the mobile communication device, one or more offer indicators, each offer indicator associated with a determined offer and presented proximate in location to display of a corresponding product, wherein the offer indicator is a graphical representation that highlights, superimposes or outlines the corresponding product.

2. The method of claim 1, further comprising capturing, by a computing device processor, a code located on or proximate to one or more of the products and reading, via a computing device processor, the code to further assist in identifying the product.

3. The method of claim 1, further comprising receiving, at the mobile communication device, wireless communication from a product-identifying tag associated with a corresponding product, wherein information read from the product-identifying tag further assists in identifying the product.

4. The method of claim 1, wherein identifying products further comprising determining, by a computing device processor, a location of the mobile communication device and determining, by a communication device processor, the one or more products based at least in part on the determined location.

5. The method of claim 1, wherein determining one or more offers further comprises determining, by the computing device processor, a product warranty offer for one or more of the identified products.

6. The method of claim 1, wherein determining one or more offers further comprises determining, the computing device processor, user-configured offers for one or more of the identified products.

7. The method of claim 6, wherein determining user-configured offers further comprises determining, the computing device processor, user configured merchant-specific or manufacturer-specific offers for one or more of the identified products.

8. The method of claim 1, wherein presenting one or more offer indicators further comprises identifying a type of offer based on a type of offer indicator.

9. The method of claim 1, further comprising communicating, by the mobile communication device, a user alert that is configured to notify a user of the mobile communication device of the presenting of the offer indicators.

10. The method of claim 1, further comprising receiving, at the mobile communication device, a user input that is configured to select an offer for inclusion in an electronic wallet.

11. The method of claim 1, further comprising receiving, at the mobile communication device, a user input that is configured to select an offer for presentation of further details associated with the offer.

12. The method of claim 1, further comprising receiving, at the mobile communication device, a user input that is configured to select an offer for online purchase of the product and redemption of the offer.

13. The method of claim 1, further comprising receiving, at the mobile communication device, a user input that is configured to select an offer for initiating an electronic wallet transaction for purchasing the product and redeeming the offer at a currently located retailer.

14. An apparatus for providing product offers, the comprising:
    a mobile communication device including a computing platform including a processor, a memory in communication with a processor and an image capturing device in communication with the processor;
    product identification application stored in the memory, executable by the processor and the image capturing device and configured to capture a live video stream of a surrounding environment that includes one or more products and determine, by implementing object recognition processing, that one or more images in the live video stream identify the one or products, wherein object recognition processing provides for identifying the products in the images based on pattern recognition that compares the one or more images to stored markers associated with the products;
    offer determination application stored in the memory, executable by the processor and configured to determine one or more offers, each offer associated with one or more of the identified products determine that at least one of the offers is related to a product associated with either a merchant or a manufacturer designated by pre-configuration by the user of the mobile communication device and, in response to determining that the at least one offer is related to a product associated with either a merchant or a manufacturer designated by pre-configuration by the user, retrieve the one or more offers from an offers database;
and
an offer presentation application stored in the memory, executable by the processor and configured to, in response to determining that the at least one offer is related to a product associated with either a merchant or a manufacturer designated by pre-configuration by the user, present, within the live video stream displayed on the mobile communication device, one or more offer indicators, each offer indicator associated with a determined offer and presented proximate in location to display of a corresponding product, wherein the offer indicator is a graphical representation that highlights, superimposes or outlines the corresponding product.

15. The apparatus of claim 14, wherein the product identification application is further configured to assist in identifying the one or more products by reading an image-based code captured by the mobile communication device, wherein the image-based code identifies one of the one or more products.

16. The apparatus of claim 14, wherein the product identification application is further configured assist in identifying the one or more products by receiving wireless communication from a product-identifying tag associated with a corresponding one of the one or more products, wherein information read from the product-identifying tag further assists in identifying the product.

17. The apparatus of claim 14, wherein the product identification application is further configured to assist in identifying the one or more products by determining a location of the mobile communication device and determining the one or more products based at least in part on the determined location.

18. The apparatus of claim 14, wherein the offer determination application is further configured to determine a product warranty offer for one or more of the identified products.

19. The apparatus of claim 14, wherein the offer determination application is further configured to least one offer for an identified product that is a new available product.

20. The apparatus of claim 14, wherein the offer determination application is further configured to determine at least one user-configured offer for one or more of the identified products.

21. The apparatus of claim 20, wherein the offer determination application is further configured to determine user-configured merchant-specific or manufacturer-specific offers for one or more of the identified products.

22. The apparatus of claim 14, wherein the offer presentation application is further configured present one or more offer indicators that identify a type of offer based on a type of offer indicator.

23. The apparatus of claim 14, wherein the offer presentation application is further configured to communicate an alert that is configured to notify a user of the mobile communication device of presentation of the offer indicators.

24. The apparatus of claim 14, wherein the offer presentation application is further configured to receive a user input that is configured to select an indicated offer for inclusion of the offer in an electronic wallet.

25. The apparatus of claim 14, wherein the offer presentation application is further configured to receive a user input that is configured to select an indicated offer for presentation of further details associated with the offer.

26. The apparatus of claim 14, wherein the offer presentation application is further configured to receive a user input that is configured to select an indicated offer for initiating online purchase of the product and redemption of the offer.

27. The apparatus of claim 14, wherein the offer presentation application is further configured to receive a user input that is configured to select an indicated offer for initiating an electronic wallet transaction for purchasing the product and redeeming the offer at a currently located retailer.

28. A computer program product, the computer program product comprising a non-transitory computer-readable medium having computer-executable instructions to cause a computer to implement the steps of:
capturing, using an image capture device disposed within the mobile communication device, a live video stream of a surrounding environment that includes one or more products;
determining, by implementing object recognition processing, that one or more images in the live video stream identify the one or products, wherein object recognition processing provides for identifying the products in the images based on pattern recognition that compares the one or more images to stored markers associated with the products;
determining one or more offers, each offer associated with one or more of the identified products;
determining that at least one of the offers is related to a product associated with either a merchant or a manufacturer designated by pre-configuration by the user of the mobile communication device;
in response to determining that the at least one offer is related to a product associated with either a merchant or a manufacturer designated by pre-configuration by the user,
retrieving the one or more offers from an offers database; and
presenting, within the live video stream displayed on the mobile communication device, one or more offer indicators, each offer indicator associated with a determined offer and presented proximate in location to display of a corresponding product, wherein the offer indicator is a graphical representation that highlights, superimposes or outlines the corresponding product.

29. The computer program product of claim 28, further comprising the step of capturing a code located on or proximate to one or more of the products and reading the code to further assist in identifying the product.

30. The computer program product of claim 28, further comprising the step of receiving wireless communication from a product-identifying tag associated with a corresponding product, wherein information read from the product-identifying tag assists in identifying the product.

31. The computer program product of claim 28, further comprising the step of determining a location of the mobile communication device and determining the one or more products based at least in part on the determined location.

32. The computer program product of claim 28, wherein the step of determining one or more offers further comprises determining a product warranty offer for one or more of the identified products.

33. The computer program product of claim 28, wherein the step of determining one or more offers further comprises determining user-configured offers for one or more of the identified products.

34. The computer program product of claim 33, wherein the step of determining user-configured offers further comprises determining user-configured merchant-specific or manufacturer-specific offers for one or more of the identified products.

35. The computer program product of claim 28, wherein the step of presenting one or more offer indicators further comprises presenting one or more offer indicators that identify a type of offer based on a type of offer indicator.

36. The computer program product of claim 28, wherein the computer-executable instructions further cause the computer to implement the step of communicating an alert that is configured to notify a user of the mobile communication device of the presenting of the offer indicators.

37. The computer program product of claim 28, wherein the computer-executable instructions further cause the computer to implement the step of receiving a user input that is configured to select an offer for inclusion in an electronic wallet.

38. The computer program product of claim 28, wherein the computer-executable instructions further cause the computer to implement the step of receiving a user input that is configured to select an offer for presentation of further details associated with the offer.

39. The computer program product of claim 28, wherein the computer-executable instructions further cause the computer to implement the step of receiving a user input that is configured to select an offer for online purchase of the product and redemption of the offer.

40. The computer program product of claim 28, wherein the computer-executable instructions further cause the computer to implement the step of receiving a user input that is configured to select an offer for initiating an electronic wallet transaction for purchasing the product and redeeming the offer at a currently located retailer.

* * * * *